United States Patent [19]

Yabu et al.

[11] Patent Number: 4,930,030
[45] Date of Patent: May 29, 1990

[54] SIGNAL RECORDING/REPRODUCING DEVICE

[75] Inventors: Atsuhiro Yabu; Toshiro Tsukahara, both of Nagaokakyo, Japan

[73] Assignee: Mitsubishi Denki Kabushiki Kaisha, Tokyo, Japan

[21] Appl. No.: 229,410

[22] Filed: Aug. 8, 1988

[30] Foreign Application Priority Data

Aug. 6, 1987 [JP] Japan .................................. 62-198468

[51] Int. Cl.$^5$ ............................................ G11B 5/588
[52] U.S. Cl. ....................................... 360/107; 360/84
[58] Field of Search ....................... 360/107, 108, 109, 130.2–130.24, 360/106, 84, 85

[56] References Cited

U.S. PATENT DOCUMENTS 4,337,492  6/1982  Brookhart et al. ................. 360/109
4,438,469  3/1984  Ohba et al. .......................... 360/109

FOREIGN PATENT DOCUMENTS 2076578  12/1981  United Kingdom .

OTHER PUBLICATIONS

"Actuator Coil Assembly Design Determines Direction of Coil Expansion", IBM TDB, Oct. 1987, vol. 30, No. 5, pp. 149–150.
"Noiseless Trick-Play Techniques Using Piezoelectric Ceramic Actuator for VTR's", National Technical Report, Jun. 1982, vol. 28, No. 3, pp. 39–47.

Primary Examiner—David J. Severin
Attorney, Agent, or Firm—Sughrue, Mion, Zinn, Macpeak & Seas

[57] ABSTRACT

An automatic tracking speed compensating drive unit 4a for a rotary drum VCR includes a deflection control coil 44 wound around a bobbin 43 mounted to a magnetic yoke assembly 47 by upper and lower spring plates 200, 100. The lower plate has a larger spring constant than the upper plate such that the "softer" upper plate absorbs substantially all thermally induced axial elongations of the bobbin, thereby avoiding tracking errors of a magnetic r/w head 5 mounted on a tab extending outwardly from the "stiffer" lower spring plate.

7 Claims, 2 Drawing Sheets

SIGNAL RECORDING/REPRODUCING DEVICE

BACKGROUND OF THE INVENTION

This invention relates to an axially deflectable rotary transducer head assembly for a video cassette tape recorder (VCR).

Automatic VCR tracking systems in which the magnetic transducer head is controllably deflected or adjusted in the direction of the tape width to ensure the accurate tracing of data tracks, recorded on the tape at a normal feed speed, during playback or reproduction at a different speed are known.

One such system is disclosed in commonly assigned, copending U.S. Pat. No. 4,882,635 filed on July 14, 1987 as illustrated in the cross-sectional and plan views of FIGS. 1 and 2, wherein reference numeral 1 designates a rotary shaft, 2 is a fixed lower drum, 3 is a rotary upper drum, 6 are bearings for the shaft, 7 is an upper transmitter which rotates with the drum 3, 8 is a lower transmitter mounted on the fixed drum 2, 9 is a base block for mounting the upper drum to the shaft, and 13 designates a magnetic tape wrapped obliquely around the outer surfaces of the upper and lower drums.

A drive unit 4a disposed in a recess 50 of the upper drum 3 and secured thereto by a screw 48 mounts a magnetic transducer head 5 for controlled vertical displacement pursuant to automatic tracking speed compensation, i.e. displacement in a direction parallel to that of the drum shaft 1. A plurality of electrodes 15 mounted to the base block 9 are disposed in sliding engagement with an equal plurality of fixed contacts 14. A connector post 16 is electrically coupled to the drive unit 4a through the electrodes 15, a connector 12, and a wiring plate 11. The head 5 is electrically connected to the upper transmitter 7 through a connector post 10, the wiring plate 11, and the connector 12.

The drive unit 4a will be described in greater detail with reference to FIGS. 3 through 6, wherein reference numeral 41 designates a circular lower spring plate made of a non-magnetic material and having an outwardly extending arm or tab on which the head 5 is mounted, 43 is a coil bobbin attached to the spring plate 41, 44 is a deflection control coil wound around the bobbin, 42 is a circular upper spring plate attached to the bobbin and deformable together with the lower spring plate when the bobbin is linearly driven in a vertical direction, 45 and 46 are lower and upper, cylindrical, permanent pole magnets extending within the bobbin and having oppositely oriented polarities, 46a designates a ferromagnetic center pole disposed within the bobbin between the two permanent magnets, and 47 is a yoke assembly constituted by lower, intermediate and upper portions 47a, 47b and 47c. A window 49 is provided in the lower portion of the assembly, through which the tab of the lower spring plate extends such that the head 5 fixed to the end thereof is disposed in sliding contact with the tape 13 as shown in FIG. 1. The bobbin 43 and coil 44 are disposed for vertical movement in an annular gap defined between the intermediate yoke portion 47b and the magnets 45, 46 and the center pole 46a. The outer peripheries of the spring plates 41, 42 are clamped between the yoke assembly portions as shown in FIG. 4. A threaded bore 48a in the upper portion 47c accommodates the screw 48 for mounting the yoke assembly 47 to the upper wall 50a of the upper drum recess 50.

Referring to FIG. 4, a first closed magnetic circuit is formed by the yoke portions 47a, 47b and the permanent magnet 45 through which a magnetic flux D flows radially outwardly from the center pole 46a in a toroidal path. A second closed magnetic circuit is similarly formed by the yoke portions 47b, 47c and the permanent magnet 46 to accommodate a magnetic flux E which flows in a toroidal direction opposite to that of flux D. The total flux traversing the coil 44 is thus the sum of the two fluxes D and E. Accordingly, automatic tracking compensation may be implemented by applying an appropriate control signal to the coil 44 from a source, not shown, which serves to linearly displace the coil and thus the bobbin, the spring plates 41, 42 and the magnetic head 5 in a vertical direction parallel to the drum shaft 1.

A problem with such a tracking compensation arrangement arises due to the plates 41, 42 having substantially the same spring constant. As a result, when the energized coil 44 and the bobbin 43 undergo an axially elongating thermal expansion, the upper and lower spring plates are bent or distorted by equal amounts to accommodate such expansion as shown in FIG. 6. As a result the vertical position of the magnetic head 5 relative to the drum and thus the tape width, shown in FIG. 6 with reference to the wall 50a of the upper drum recess, increases from F to G which adversely affects the head tracking accuracy and thus the fidelity of the reproduced signal. Such distortion might be at least partially reduced by fabricating the coil bobbin 43 from a material having a very low coefficient of thermal expansion, but such materials are rather "exotic" and thus expensive.

SUMMARY OF THE INVENTION

This invention eliminates the above described thermal expansion problem attendant with the known construction by configuring the upper and lower spring plates such that the lower plate mounting the magnetic head has a substantially larger spring constant than the upper plate. As a result, the comparatively "softer" and more resilient upper spring plate absorbs or undergoes substantially all of the bending or distortion necessary to accommodate any axial thermal expansion (or contraction) of the coil and bobbin. The position of the relatively "stiff" lower spring plate and the magnetic head mounted thereon is thus substantially unaffected by thermally induced bobbin elongations, and the head tracking accuracy and attendantly the reproduced signal fidelity are correspondingly improved.

DETAILED DESCRIPTION OF THE PREFERRED EMBODIMENTS

Figure 1:
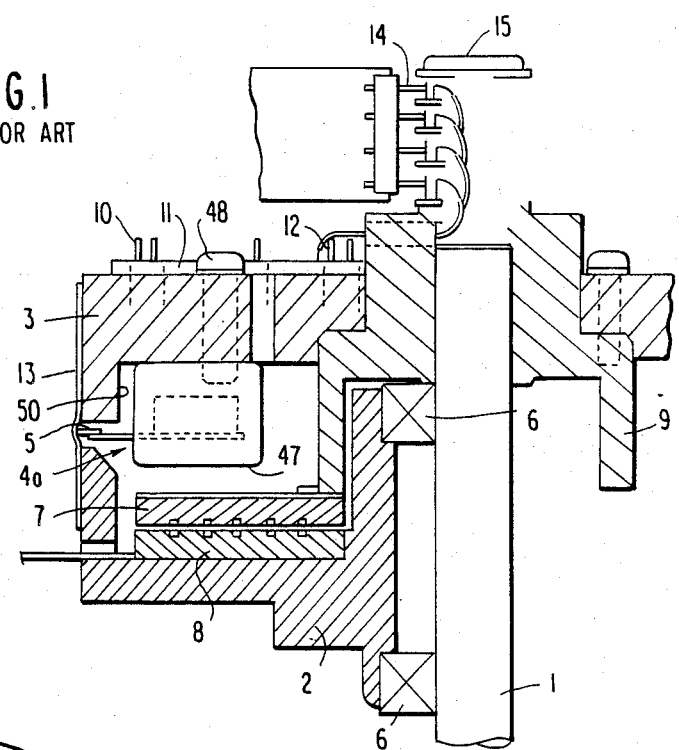
FIG. 1 is a sectional elevation of a known rotary head assembly.
Figure 2:
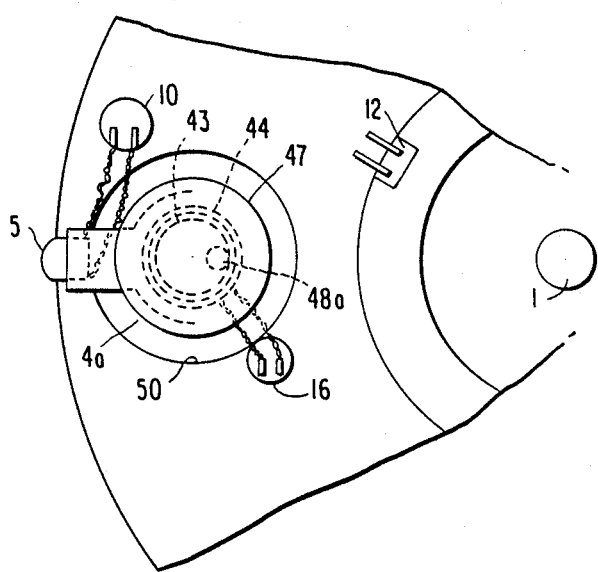
FIG. 2 is a partial plan view of the head assembly of FIG. 1.
Figure 3:
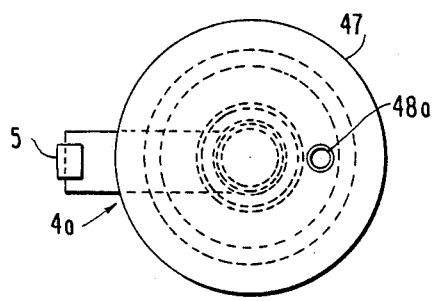
FIG. 3 is a plan view of a drive unit of the known head assembly.
Figure 4:
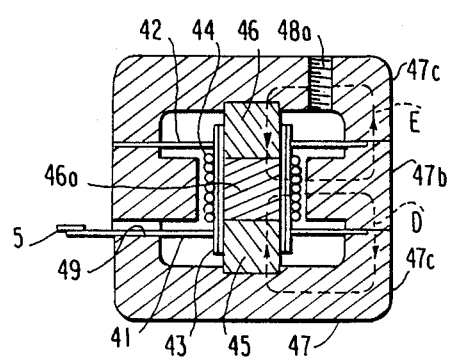
FIG. 4 is a sectional elevation of the drive unit shown in FIG. 3.
Figure 5:
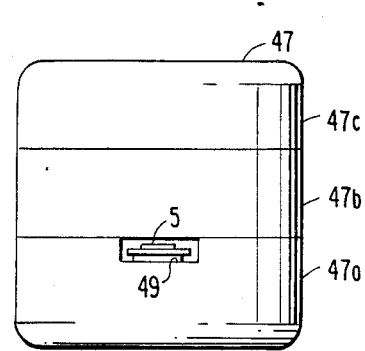
FIG. 5 is a front view of the known drive unit.
Figure 6:
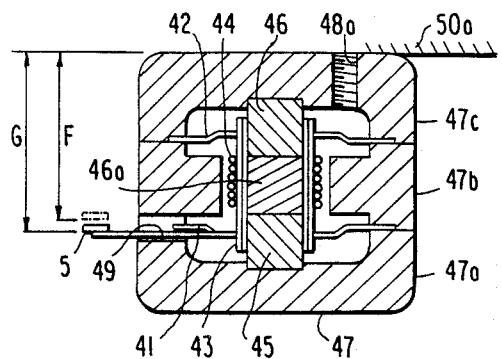
FIG. 6 is a sectional elevation similar to FIG. 4, illustrating the effects of thermal expansion.
Figure 7:
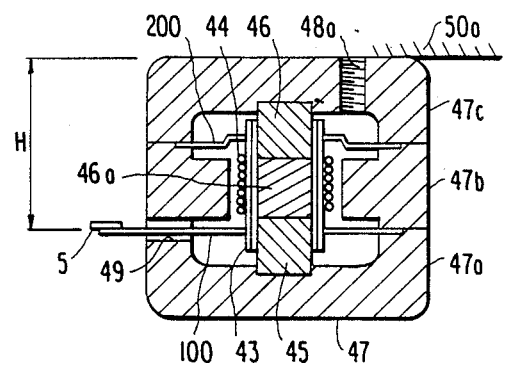
FIG. 7 is a sectional elevation of a drive unit for a rotary head assembly in accordance with the invention.

Referring to FIG. 7, wherein the same reference numerals used in connection with FIGS. 3–6 designate like components, the lower spring plate 100 is here stamped from a sheet of nonmagnetic material having a thickness substantially greater than that of the sheet from which the upper spring plate 200 is stamped (although this is not readily visible in the drawing owing to the small dimensions of the spring plates). As a result, and as shown in FIG. 7, the axial elongation of the bobbin 43 and coil 44 due to thermal expansion is almost entirely absorbed by the deformation of the upper spring plate 200 due to its much smaller spring constant as compared with that of the thicker lower spring plate 100. Thus, the lower spring plate undergoes substantially no deformation to accommodate thermal expansions and contractions of the bobbin, and the spacing H of the magnetic head 5 from the wall 50a of the upper drum recess remains substantially constant; it is exclusively varied, in an essentially linear manner, by applying an appropriate control signal to the coil 44 pursuant to automatic tracking compensation. Moreover, by tolerating and effectively compensating for thermally induced bobbin elongations in accordance with the invention instead of attempting to minimize them, the resort to costly bobbin materials having low coefficients of thermal expansion is thus avoided.

Figure 8A:
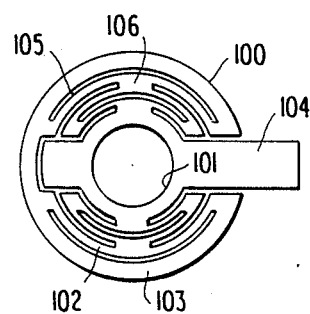
FIGS. 8(a) and 8(b) are plan views of specific lower and upper spring plate constructions in accordance with the invention.
Figure 8B:
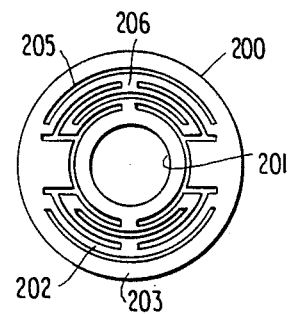

Instead of providing the larger and smaller spring constants for the lower and upper spring plates by configuring them from materials having different thicknesses as described above, the same effects can be achieved by appropriately varying their geometric patterns or configurations as illustrated in FIGS. 8(a) and 8(b). Referring to these figures, each spring plate 100, 200 includes a central aperture 101, 201 for mounting to the coil bobbin 43, an outer peripheral portion 103, 203 for clamping between the yoke assembly portions, and intermediate portions 102, 202 provided with a plurality of concentric, arcuate slots 105, 205. In addition, the lower spring plate 100 is provided with an outwardly extending tab 104 to which the magnetic head 5 is fixed. As may be seen by comparing FIGS. 8(a) and 8(b), the gaps or spaces 106 between adjacent slot ends in the lower spring plate 100 are wider than the corresponding gaps 206 in the upper spring plate 200, thereby rendering the lower spring plate stiffer than the upper one and imparting a larger spring constant to it. As obvious alternatives to achieve the same effect, the cumulative length of the slots 205 in the upper spring plate may be greater than the overall length of the slots 105 in the lower plate and/or the upper plate slots may be made wider than those of the lower plate.

As will also be readily apparent to those skilled in the art, the described configurations may be "reversed" such that the upper spring plate is the stiffer on and mounts the magnetic head.

What is claimed is:

1. A signal recording/reproducing device, comprising:
   (a) a rotary drum (3),
   (b) a magnetic tape (13) wrapped obliquely around an outer peripheral surface of the drum,
   (c) a drive unit (4a) mounted to the drum for rotation therewith and including a yoke assembly (47), a bobbin (43) disposed proximate the yoke assembly, first and second spaced, parallel spring plates (100, 200) mounting the bobbin to the yoke assembly, a magnetic r/w head (5) mounted to the first spring plate and disposed in engagement with the tape, and a coil (44) wound around the bobbin for axially deflecting the bobbin and thus the spring plates and magnetic head in response to an automatic tracking speed compensation signal applied thereto, and
   (d) means for preventing tracking errors caused by thermally induced axial elongations of the bobbin, said preventing means being characterized by the first spring plate having a larger spring constant than the second spring plate such that axial bobbin elongations are primarily absorbed by the deflection of the second spring plate.

2. A device according to claim 1, wherein the first spring plate is thicker than the second spring plate.

3. A device according to claim 1, wherein the spring plates are circular and define a plurality of concentric, arcuate slots, the configurations of said slots being different in the first and second spring plates such that a larger spring constant is imparted to the first spring plate.

4. A device according to claim 3, wherein at least some of the slots in the second spring plate are longer than corresponding slots in the first spring plate.

5. A device according to claim 3, wherein at least some of the slots in the second spring plate are wider than corresponding slots in the first spring plate.

6. A device according to claim 3, wherein gaps between adjacent slot ends in the first spring plate are wider than corresponding gaps in the second spring plate.

7. A transducer head assembly for a signal recording/reproducing device, comprising:
   (a) a yoke assembly (47),
   (b) a bobbin (43) disposed proximate the yoke assembly,
   (c) first and second spaced, parallel spring plates (100, 200) mounting the bobbin to the yoke assembly,
   (d) a magnetic r/w head (5) mounted to the first spring plate,
   (e) a coil (44) wound around the bobbin for axially deflecting the bobbin and thus the spring plates and magnetic head in response to a control signal applied thereto, and
   (f) means for preventing tracking errors caused by thermally induced axial elongations of the bobbin, said preventing means being characterized by the first spring plate having a larger spring constant than the second spring plate such that axial bobbin elongations are primarily absorbed by the deflection of the second spring plate.

* * * * *